(12) United States Patent
Hao et al.

(10) Patent No.: US 9,833,740 B2
(45) Date of Patent: Dec. 5, 2017

(54) MODIFIED CERAMSITE PACKING USEFUL FOR BIOMEMBRANE TRICKLING FILTER AND A PROCESS FOR REMOVING SO2 FROM FLUE GAS USING THE TRICKLING FILTER

(71) Applicants: China Petroleum & Chemical Corporation, Beijing (CN); Research Institute of Nanjing Chemical Industrial Group, Nanjing (CN)

(72) Inventors: Aixiang Hao, Nanjing (CN); Songbai Mao, Nanjing (CN); Jing Kong, Nanjing (CN)

(73) Assignees: CHINA PETROLEUM & CHEMICAL CORPORATION, Beijing (CN); RESEARCH INSTITUTE OF NANJING CHEMICAL INDUSTRIAL GROUP, Nanjing (CN)

( * ) Notice: Subject to any disclaimer, the term of this patent is extended or adjusted under 35 U.S.C. 154(b) by 591 days.

(21) Appl. No.: 14/307,976

(22) Filed: Jun. 18, 2014

(65) Prior Publication Data

US 2014/0370578 A1 Dec. 18, 2014

(30) Foreign Application Priority Data

Jun. 18, 2013 (CN) .......................... 2013 1 0240934

(51) Int. Cl.
| | | |
|---|---|---|
| *A61L 9/01* | (2006.01) | |
| *C12N 1/38* | (2006.01) | |
| *B01D 53/84* | (2006.01) | |
| *B01D 53/78* | (2006.01) | |
| *B01D 53/18* | (2006.01) | |
| *B01D 53/22* | (2006.01) | |

(52) U.S. Cl.
CPC ............. *B01D 53/84* (2013.01); *B01D 53/18* (2013.01); *B01D 53/228* (2013.01); *B01D 53/78* (2013.01); *B01D 2257/302* (2013.01); *B01D 2258/0283* (2013.01)

(58) Field of Classification Search
None
See application file for complete search history.

(56) References Cited

U.S. PATENT DOCUMENTS

| 5,196,176 A | 3/1993 | Buisman |
|---|---|---|
| 6,221,652 B1 | 4/2001 | Janssen et al. |

FOREIGN PATENT DOCUMENTS

| CN | 101073745 A | | 11/2007 | |
|---|---|---|---|---|
| CN | 101948166 | * | 1/2011 | ................ C02F 3/10 |
| CN | 102228789 | * | 11/2011 | ............. B01D 53/84 |
| CN | 102716664 | * | 10/2012 | ............. B01D 53/84 |
| CN | 202741000 | * | 2/2013 | ............. B01D 53/84 |
| CN | 203065461 U | | 7/2013 | |

\* cited by examiner

*Primary Examiner* — Thomas J Visone
(74) *Attorney, Agent, or Firm* — Buchanan Ingersoll & Rooney PC

(57) ABSTRACT

A process of removing $SO_2$ from a flue gas with a trickling filter using modified ceramsite packing is described. The biological flue gas desulfurization process includes: feeding the flue gas containing sulfur dioxide through the column bottom into the biomembrane trickling filter at certain temperature, contacting with the modified ceramsite biomembrane packing and purifying, which purified flue gas is discharged via the column top; and spraying the nutrient fluid rich in high concentration of the desulfurization strain through the top to the modified ceramsite biomembrane packing, thereby the sulfur-bearing pollution source in the flue gas is degraded, so as to discharge a purified flue gas satisfying the environmental requirements.

11 Claims, 2 Drawing Sheets

MODIFIED CERAMSITE PACKING USEFUL FOR BIOMEMBRANE TRICKLING FILTER AND A PROCESS FOR REMOVING SO2 FROM FLUE GAS USING THE TRICKLING FILTER

TECHNICAL FIELD

The present invention relates to the field of desulfurization, specifically to a modified ceramsite packing useful for a biomembrane trickling filter and a process of removing $SO_2$ from flue gas using the trickling filter.

BACKGROUND

The harm of $SO_2$, as a severe problem of the environmental pollution, has been highly focused on by the governments and the environmental protection organizations throughout the world. The $SO_2$ pollution control technologies can be classified into three categories according to the processes as follows: pre-combustion desulfurization, oxy-fuel desulfurization and post-combustion desulfurization (also called as Flue Gas Desulfurization, abbreviated as FGD). Among others, the flue gas desulfurization is the only desulfurization manner commercialized in industrial scale up to now, and is recognized as the predominant means to control most effectively the $SO_2$ contamination. However, the flue gas desulfurization processes currently in tests or applications are generally encountered with the technical or economic problems of possessing complex processing procedures, high equipment investment or operation cost, low removal efficiency of $SO_2$ from the flue gas, difficult treatment and/or utilization of the byproducts and the like, and thus cannot be effectively spread widely.

Since 1980s, the exploration of new flue gas desulfurization process with advanced technology and economic cost has been always one of the hot studies in the environmental protection field. Microorganisms can be used for flue gas desulfurization, wherein the metabolic process of $SO_2$ by chemoautotrophic microorganisms is used to remove the oxides of sulfur from flue gas. Such a process has the advantages of low operation cost, simple devices, low nutritional requirement as the autotrophic microorganisms are used, and the avoidance of secondary pollution. Therefore, the biological flue gas desulfurization is a technically novel biotechnology with high applicability, and thus has attractive prospect and potential.

Currently, the devices for the biological purification of waste gas comprise mainly three types: biological filter (BF), biological scrubber (BS) and biomembrane trickling filter (BTF). Biomembrane trickling filter is an intermediate processing technique between the biological filter and the biological scrubber, wherein the liquid phase of the biomembrane trickling filter flows continuously or flows in batches, and the microbial community is immobilized on the filtration bed, so that the adsorption of contaminants and biodegradation occur concurrently in one same reactor. Among the existing biological waste gas treatment processes, the bio-trickling filtration is the most promising one, having the advantages of easy operation, low investment and operation cost, pH-adjustable, fitting for the medium concentration of waste gas, being capable of adding with nutrient substance and the like.

Packing is the carrier of the microorganism in a biomembrane trickling filter, and is the primary location for the biological immobilization and contaminant disposal. The characteristics of the packing affect directly the growth of biomass in the packing layer, the energy consumption of the system, and the mass transfer process of odor contaminants in the gas-liquid-solid triphases and the distribution coefficient thereof. Therefore, the characteristics of the packing affect directly the treating efficiency of the biomembrane trickling filter. According to the adsorption theory, the packing should be selected with large specific surface area, good bio-affinity, acid resistance, alkali-resistance, oxidation resistance, long performance life, light weight, great mechanical strength, an installation and maintenance convenience, and cheap cost. The preferable packing increases the microorganism concentration per unit volume within the reactor, and the mass transfer of the contaminants to the microorganism, so as to enhance the systemic processing capacity, buffering capacity and system loading.

Currently, the conventional bio-packing useful for a biomembrane trickling filter is generally an inert packing, for example: rock wool-compost, zeolite, hybrid packing, light ceramsite, usually a silicate mineral or organic polymer, bearing negative charges by itself. Moreover, the packing has the disadvantages of high cost, high energy consumption, low mechanical strength, poor abrasion resistance and the like. Meanwhile, as the roughness of the packing surface is insufficient, the microorganism is difficult to be attached onto the packing surface in a short time, leading to the phenomenon of a long term of biomembrane colonization, easy slough of the biomembrane, which is unfavorable for the growth and propagation of the microorganism, and poor performance of the membrane, resulted from the existing packing.

Therefore, the modification on the packing surface of the polymeric material is particularly very necessary. It is generally considered that a packing with relatively weak adsorbability can be greatly improved for the adsorbability after modification. The modification technology has been gradually known by the artisans in the recent decade, wherein the fundamental theory for modifying a packing is to change the physicochemical properties of a packing or the surface thereof, and has been well studied in waste water treatment. It is indicated that the physical and chemical properties of the packing surface coating affecting the removal of the particles and the dissolved substance, the large specific surface area of the coating, adsorption sites on the surface, the surface roughness and the porosity bring the advantages of the modified packing.

It is recently focused on the study of flue gas desulfurization by microorganism to use a biomembrane trickling filter as the desulfurization reactor. Regarding a bio-trickling filtration, the biomembrane attached on the packing is the principle section of the reactor. The removal of contaminants depends primarily on the action of the biomembrane grown on the carrier, wherein the characteristics of the biomembrane will affect the conversion of contaminants. Meanwhile, the attaching and growing characteristics of the microorganisms on the packing surface are associated with the physical and chemical properties of the packing. The currently used bio-trickling filtration processes have generally the disadvantages of low desulfurization efficiency, a long period of biomembrane colonization, poor stability of the desulfurization efficiency and the like.

SUMMARY OF THE INVENTION

In order to solve the problems of the prior technology, the purpose of the present invention is to provide modified ceramsite packing useful for a biomembrane trickling filtration column and a process of the removing $SO_2$ from a flue gas using the trickling filter.

In the process according to the present invention, the ceramsite packing is subjected to a chemical modification, so as to immobilize better the biological desulfurization microorganism strain. A biomembrane colonization is carried out in the column, such that a more stable, homogeneous and compact biomembrane is present on the packing surface. The sulfur dioxide-containing flue gas to be treated is subjected to a gas-liquid phase counter-current operation in the biomembrane trickling filter, such that the sulfur-bearing contaminant source is degraded better, and the treatment effect from biological flue gas desulfurization in the biomembrane trickling filter is increased.

Accordingly, the present invention provides a process of removing $SO_2$ from flue gas with a biomembrane trickling filter using a modified ceramsite packing, in which the principle section of the biomembrane trickling filter can be a packed column comprising a liquid circulation system and a gas circulation system, characterized in: chemically modifying the packing, then introducing desulfurization strain into a nutrient fluid, and carrying out the biomembrane colonization for the packing within the column so as to form a biomembrane of the desulfurization strain on the packing surface, wherein a counter-current operation is adopted in the column to remove $SO_2$ from the flue gas. The temperature for the desulfurization process in the biomembrane trickling filter is about 20 degrees C.-about 40 degrees C., preferably about 25 degrees C.-about 35 degrees C.

Generally, in the process according to the present invention, the flue gas containing sulfur dioxide is fed via a gas distributor at the bottom of the biomembrane trickling filter, and the purified flue gas is discharged via a demister at the column top, so as to form a gas circulation. The nutrient fluid is fed via a sprayer at the top of the biomembrane trickling filter to spray the packing layer, flowed downward in the packing, discharged at the column bottom to enter a circulation tank, and then returned by way of a circulation pump to the column top, so as to form a liquid circulation. In addition, when the electric conductivity of the circulating liquid exceeds 100 mS/cm, a part of the spent nutrient fluid needs to be discharged, and fresh nutrient fluid is supplied to the circulating liquid tank.

The packing column can be a conventional biomembrane trickling filter, and the principle section thereof can be a conventional packing column having multi-stages of packing. Selecting from the height of the packing and regulating the position of the packing is pursuant to the gas source of the flue gas and the purification effect. A conventional packing column having three stages of packing is preferred, in order to save energy.

The original packing can be a ceramsite chemically modified. The advantages of the chemically modifying process lay in the physical and chemical properties of the packing surface coating affecting the removal of the particles and the dissolved substance, the large specific surface area of the coating, adsorption sites on the surface, the surface roughness and the porosity, so as to adsorb more biomass. The preparation of the modified ceramsite can comprise the procedures of: (1) a pre-treatment stage: drying a cleaned conventional ceramsite, for example by baking; impregnating with a solution of acid (such as inorganic acid, e.g. nitric acid, hydrochloric acid or sulfuric acid, preferably $H_2SO_4$, for instance 10%-30% of $H_2SO_4$) for 20-40 hours, and washing with water to be neutral; (2) a ultrasonic impregnating stage: ultrasonically impregnating the neutral ceramsite obtained into an aqueous solution of a modifier in a concentration of 0.5 mol/L-2 mol/L at a temperature of 60 degrees C.-100 degrees C. for 20-40 hours, wherein the neutral ceramsite after ultrasonic impregnation by the modifier is further baked at 100 degrees C.-120 degrees C. for 2 hours, and the modifier is a conventional modifier for modifying the ceramsite, such as an aqueous solution of metal salt, e.g. iron chloride, ferric nitrate, aluminum sulfate, aluminum chloride and the like; (3) a high temperature calcinating stage: calcinating the ultrasonically impregnated and baked ceramsite packing at a temperature of 300 degrees C.-700 degrees C. for 1-5 hours, preferably 1-4 hours, and cooling to room temperature, washing with distilled water, and baking at a temperature of 100 degrees C.-120 degrees C. for 2-4 hours, so as to obtain the modified ceramsite packing.

In the chemically modifying process described above, the pre-treatment stage functions to remove impurities harmful to the immobilized microorganism from inside and outside surfaces of the ceramsite, to enlarge the volume of the inner pore, to recover the activation ability of the ceramsite surface, and to enhance the adhesion of the modifier. The ultrasonic impregnation process functions predominantly to contact the modifier with ceramsite sufficiently, and to change the physical and chemical properties of the inside and outside surfaces of the ceramsite. The baking functions primarily to sterilize, so as to remove bacteria harmful to the immobilized microorganism; and secondly to remove the moisture content in the inner pore of the ceramsite. The high temperature calcination functions to evaporate HCl or $HNO_3$ from the solution, concentrate the modifier, and deposit metal oxide on the ceramsite surface, so as to render the modified ceramsite with special performances different from the original one. The calcinating parameters including calcination temperature, calcination time and the like affect directly the performances of the modified packing.

On the basis of measurement and analysis, the physical and chemical performance parameters of the modified ceramsite comprise: a density of about 2.1-about 2.5 $g/cm^3$, a specific surface area of about 0.4-about 0.8 $m^2/g$, a porosity of about 0.5-about 0.7, a pH value at isoelectric point of about 7.5-about 9.0, and a surface pH value of about 5.0-about 6.0. The coating amount per unit weight of the ceramsite is about 40-about 60 mg/g. Compared with a conventional ceramsite, the modified ceramsite is increased with the specific surface area, hydrophility, bio-capacity per unit volume of packing, and the porosity such that the interface between the gas and the microorganism is enlarged. The modified packing provides a favorable living environment to the microorganism, which serves in turn a location for a favorable mass transfer and reaction. The mass transfer rate of a sulfur-bearing gas source in the biomembrane trickling filter is thus increased. It thus can be seen that the packing performances affect directly the treatment efficiency of the biomembrane trickling filter. The conventional ceramsite means a commercially available one used generally as a conventional packing, which is in the form of a sphere in a particle diameter of about 3-about 5 mm, having performance parameters of: a density of about 2.041 $g/cm^3$, a specific surface area of about 0.35 $m^2/g$, a porosity of about 0.55, a pH value at isoelectric point of about 1.50, and a surface pH value of about 6.96.

The chemically modified ceramsite packing is placed in the column for the biomembrane colonization of the desulfurization bacteria, wherein the specific process of colonizing biomembrane in the column comprises introducing directly the desulfurization strain in a nutrient fluid, spraying the nutrient fluid containing the desulfurization strain downward in the biomembrane trickling filter onto the packing while contacting with the upward $SO_2$-containing flue gas in a converse direction, so as to form a biomembrane through the counterflow of the gas-liquid phases, by which the desulfurization strain is immobilized to the packing. When the efficiency of removing $SO_2$ by the desulfurization strain is decreased to 80% or less, dominant bacteria is added to accelerate the domestication of the biomembrane-forming efficiency, so as to grow gradually a stable, homogeneous and compact biomembrane, after about 8-10 days.

The desulfurization strain having the ability of removing $SO_2$ from flue gas in liquid phase under acidic pH conditions is obtained by using the specific strain screening and domestication device and technology useful for waste gas purification (see, for example, CN203065461U). The nutrient solution above consists of an aqueous mixture of two or more of ammonium sulfate, potassium chloride, potassium hydrogen phosphate, magnesium sulfate heptahydrate, calcium nitrate, ammonium chloride, ammonium dihydrogen phosphate, calcium chloride and Iron(II) sulfate heptahydrate.

The desulfurization strain according to the present invention is one or more selected from the group consisting of *Thiobacillus ferroxidans, Thiobacillus thioparus, thiobacillus denitrificans, desulfovibrio, Leptospirillums ferrooxidans, thiobacillus thiooxidans* or *Thiothrix*.

When the process according to the present invention is used to treat sulfur dioxide in a coal-fired flue gas, the biomass immobilized in the column after treatment by the modified packing is relatively much, which can bring a relatively high removal of sulfur dioxide, and a relatively high recovery of the sulfur-containing resource, so as to achieve the resource recovery of waste gas. Meanwhile, the ceramsite packing is innoxious, odourless, and environmentally friendly one with excellent acid resistance, thermo-stability and biological stability. The present invention has the advantages including green environmental protection, high purification performance, low investment cost, low operation cost, high operability, and multiple utilizations of the byproducts. Therefore, the present invention can be used to remove sulfur dioxide from coal-fired flue gas with high efficiency and low consumption, and thus has favorable economic benefit and social benefit.

According to the process of the present invention for biological flue gas desulfurization, the biomembrane trickling filter possesses good prospect for waste water and waste gas treatment, purification or separation of volatile organics and the like. The biological flue gas desulfurization process has significant importance not only to the technical modification and improvement of the existing desulfurization systems, but also to the reduction of investment and operation costs for a newly established flue gas purification system as well as the increase of purification efficiency.

Figure 1:
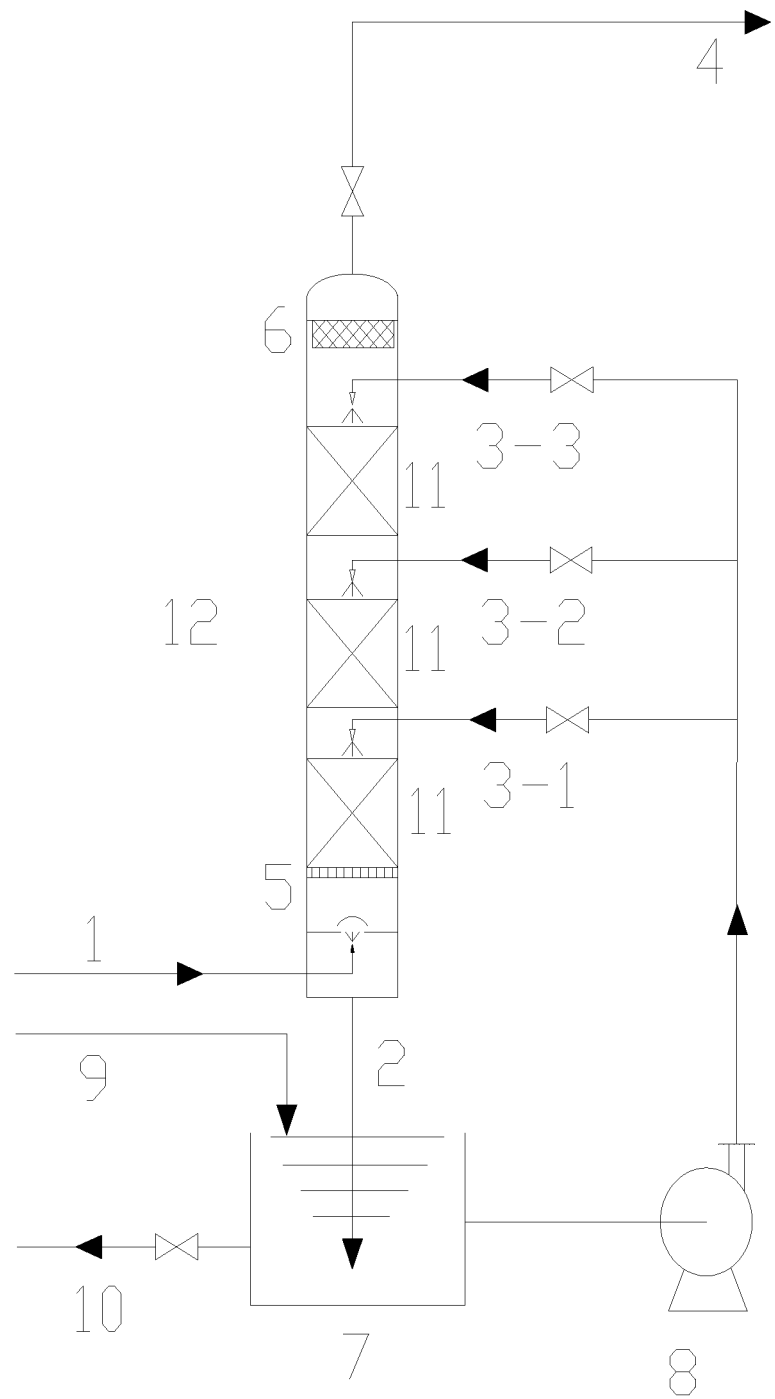
FIG. 1 is a flow chart showing the process according to the Examples of the present invention.

In the FIG. 1, 1 denotes an raw material gas inlet, 2 denotes an nutrient fluid outlet, 3-1, 3-2, 3-3 denote respectively the nutrient fluid spraying inlets 1, 2 and 3, 4 denotes an purified gas outlet, 5 denotes a gas distributor, 6 denotes a demister, 7 denotes a circulating liquid store tank, 8 denotes a circulating liquid pump, 9 denotes a nutrient fluid inlet, 10 denotes an effluent outlet, 11 denotes the modified ceramsite packing, and 12 denotes the biomembrane trickling filter.

Figure 2:
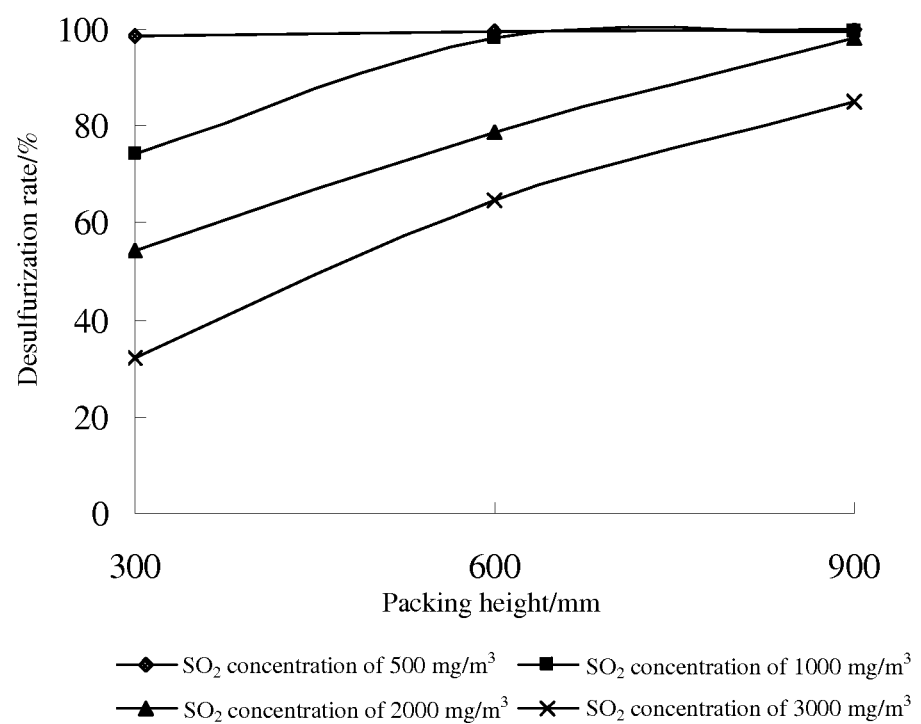

FIG. 2 shows the influence by the height of the packing on the desulfurization efficiency from the Examples.

EMBODIMENTS

The present invention will be illustrated in more detail with Examples and referring to the figures below.

As shown in FIG. 1, the present invention is achieved by using a biomembrane trickling filter, operated in the form of a gas-liquid phase counter-current operation. A flue gas containing sulfur dioxide is fed via the raw material gas inlet 1, and introduced into the biomembrane trickling filter 12 through the gas distributor 5, then the purified flue gas is discharged via the purified gas outlet 4 at the column top through demister 6. The nutrient fluid from the circulating liquid store tank 7 is fed via the nutrient fluid spraying inlet 3-1 (at 300 mm height for a one-stage packing layer) or 3-2 (at 600 mm height for a two-stage packing layer) or 3-3 (at 900 mm height for a three-stage packing layer) through the circulating liquid pump 8, flowed downward through the modified ceramsite packing 11, and returned finally into the circulating liquid store tank 7 via the nutrient fluid outlet at the column bottom. In addition, a part of the nutrient fluid effluent is discharged periodically via the effluent outlet 10, and fresh nutrient fluid is supplied to the circulating liquid store tank 7 via the nutrient fluid inlet 9.

EXAMPLES

Materials

The conventional ceramsite: from Ping Xiang Feiyun Ceramics Industries Co., Ltd., Jiangxi, China, which was in the form of a sphere in a particle diameter of Φ3-5 mm, having performance parameters of: a density of 2.041 g/cm$^3$, a specific surface area of 0.35 m$^2$/g, a porosity of 0.55, a pH value at isoelectric point of 1.50, and a surface pH value of 6.96.

The flue gas containing sulfur dioxide to be treated: the flue gas containing sulfur dioxide being a simulating flue gas formulated with $SO_2$, $N_2$ and air, wherein the concentration of $SO_2$ was controlled to be 1000-10000 mg/m$^3$, and the feeding flow of the flue gas was 30 L/h-300 L/h.

The nutrient fluid rich in high concentration of the desulfurization strain:nutrient fluid:bacteria-containing fluid=50-100:1, in which the nutrient fluid consisted of an aqueous mixture of two or more of ammonium sulfate, potassium chloride, potassium hydrogen phosphate, $MgSO_4.7H_2O$, calcium nitrate, ammonium chloride, ammonium dihydrogen phosphate, calcium chloride and $FeSO_4.7H_2O$. The desulfurization strain was one or more selected from the group consisting of *Thiobacillus ferroxidans, Thiobacillus thioparus, thiobacillus denitrificans, desulfovibrio, Leptospirillums ferrooxidans, thiobacillus thiooxidans* or *Thiothrix*.

The biomembrane trickling filter: a counter-flow type reactor, made from plexiglass, consisting of a packing column, a gas circulation system and a liquid circulation system, plus with a circulating water sheath outside for the temperature control. The bio-trickling filter had an inner diameter of 80 mm, a height of 1200 mm being divided into three layers with a packing height of 300 mm for each layer, loaded with a unmodified or modified ceramsite packing. In addition to the gas inlet, gas outlet, liquid inlet and liquid outlet, a liquid distributor was placed between every two layers of packing, a liquid spraying device was placed above every packing layer, and a demister was further placed at the column top.

Example 1

A conventional ceramsite was chemically modified as follows: (1) the conventional ceramsite was rinsed repeatedly with distilled water to be clean, and baked for 2 hours; (2) impregnated with a 10% solution of $H_2SO_4$, and washed with water to be neutral; (3) placed in an oven at a temperature of 105 degrees C. for 2 hours of drying; (4) the baked haydite was introduced into the modifier before cooling, for 20 hours of ultrasonic impregnation; (5) placed in an oven at a temperature of 105 degrees C. for 2 hours of drying; (6) the ultrasonicaly impregnated and baked ceramsite was placed immediately into a muffle furnace, calcinated at a temperature of 300 degrees C. for 1 hour, and cooled to room temperature; (7) rinsed with distilled water to be clean, and baked for 2 hours, to obtain the modified ceramsite packing. The modified ceramsite had performance parameters of: a density of 2.1 g/cm$^3$, a specific surface area of 0.4 m$^2$/g, a porosity of 0.5, a pH value at isoelectric point of 7.5, and a surface pH value of 6.0.

In order to make a qualitative analysis with the modified ceramsite, an X-ray powder method was used to analyze the coating composition of the modified ceramsite. The testing result showed that the principal ingredient of the oxidized film on the modified ceramsite surface was an oxide of iron, namely a hematite, and alpha-$Fe_2O_3$ with favorable adsorbability was present on the surface of the surface-modified ceramsite. The result by scanning electron microscope (SEM) showed that there were spheric deposits on the ceramsite surface, which were aligned homogeneously and thickly, representing the successful adhesion of the iron compound on the surface.

As the amount of the surface coating would affect the desulfurizing ability of the modified ceramsite, unmodified ceramsites with an average weight of about 10.0000 g were weighed accurately with an analytical balance, resulting in coating-modified ceramsites with an average weight of 10.4146 g, such that the coating amount of the ceramsite was 0.4146 g, and the coating amount per unit weight was 41.46 mg/g.

The modified ceramsite was used as the packing to prepare for a biomembrane with membrane-forming process in the column. Nutrient fluid rich in high concentration of desulfurization strain (nutrient fluid:bacteria-containing fluid=50:1) were injected respectively into the bio-trickling filter. The biomembrane colonization of the modified ceramsite was carried out for 12 days, resulting in a maximal biomass of 1.457 mg/g.

The desulfurization rate was measured at 97.8%, using the modified ceramsite as the packing, having a temperature of 30 degrees C., a gas flow of 180 L/h, a $SO_2$ concentration of 2000 mg/m$^3$, a packing height of 900 mm, a $Fe^{3+}$ concentration of 0.8 g/L, an initial pH value of 1.8 and a liquid spraying rate of 6 L/h in the biomembrane trickling filter.

Example 2

A conventional ceramsite was chemically modified as follows: (1) the conventional ceramsite was rinsed repeatedly with distilled water to be clean, and baked for 4 hours; (2) impregnated with a 30% solution of $H_2SO_4$, and washed with water to be neutral; (3) placed in an oven at a temperature of 105 degrees C. for 4 hours of drying; (4) the baked haydite was introduced into the modifier comprising a 1.5 mol/L of $FeCl_3$ aqueous solution before cooling, for 40 hours of ultrasonic impregnation; (5) placed in an oven at a temperature of 105 degrees C. for 4 hours of drying; (6) the ultrasonicaly impregnated and baked ceramsite was placed immediately into a muffle furnace, calcinated at a temperature of 700 degrees C. for 5 hours, and cooled to room temperature; (7) rinsed with distilled water to be clean, and baked for 4 hours, to obtain the modified ceramsite packing.

The modified ceramsite had performance parameters of: a density of 2.5 g/cm$^3$, a specific surface area of 0.8 m$^2$/g, a porosity of 0.7, a pH value at isoelectric point of 9.0, and a surface pH value of 5.0.

In order to make a qualitative analysis on the modified ceramsite, an X-ray powder method was used to analyze the coating composition of the modified ceramsite. The testing result showed that the principal ingredient of the oxidized film on the modified ceramsite surface was an oxide of iron, namely a hematite, and alpha-$Fe_2O_3$ with favorable adsorbability was present on the surface of the surface-modified ceramsite. The result by scanning electron microscope (SEM) showed that there were spheric deposits on the ceramsite surface, which were aligned homogeneously and thickly, representing the successful adhesion of the iron compound on the surface.

As the amount of the surface coating would affect the desulfurizing ability of the modified ceramsite, unmodified ceramsites with an average weight of about 10.0000 g were weighed accurately with an analytical balance, resulting in coating modified ceramsites with an average weight of 10.5832 g, such that the coating amount of the ceramsite was 0.5832 g, and the coating amount per unit weight was 58.32 mg/g.

The modified ceramsite was used as the packing to prepare a biomembrane with biomembrane-colonizing process within the column. The biomembrane colonization of the modified ceramsite was carried out for 8 days, resulting in a maximal biomass of 1.587 mg/g.

The desulfurization rate was measured at 100%, using the modified ceramsite as the packing, having a temperature of 30 degrees C., a gas flow of 180 L/h, a $SO_2$ concentration of 2000 mg/m$^3$, a packing height of 900 mm, a $Fe^{3+}$ concentration of 0.8 g/L, an initial pH value of 1.8 and a liquid spraying rate of 6 L/h in the biomembrane trickling filtration column.

Example 3

A toconventional ceramsite was chemically modified to have performance parameters of: a density of 2.238 g/cm$^3$, a specific surface area of 0.72 m$^2$/g, a porosity of 0.60, a pH at isoelectric point of 8.50, and a surface pH of 5.63.

The modified ceramsite was used as the packing to prepare a biomembrane with biomembrane colonization process in the column. The biomembrane colonization of the modified ceramsite was carried out for 10 days, resulting in a maximal biomass of 1.543 mg/g.

The desulfurization rate was measured at 98.4%, using the modified ceramsite as the packing, having a temperature of 28 degrees C., a gas flow of 180 L/h, a $SO_2$ concentration of 2000 mg/m$^3$, a packing height of 900 mm, a $Fe^{3+}$ concentration of 0.8 g/L, an initial pH value of 1.8 and a liquid spraying rate of 6 L/h in the biomembrane trickling filtration column.

Comparative Example 1

An unmodified ceramsite was used as the packing, other operation conditions being same as example 3.

The original ceramsite had performance parameters of: a density of 2.041 g/cm$^3$, a specific surface area of 0.35 m$^2$/g, a porosity of 0.55, a pH at isoelectric point of 1.50, and a surface pH of 6.96.

The unmodified ceramsite was used as the packing to prepare a biomembrane with biomembrane colonization process in the column. The biomembrane colonization of the modified ceramsite was carried out for 16 days, resulting in a maximal biomass of 1.263 mg/g. Therefore, compared with the biomembrane colonization using the modified ceramsite as packing, it was found that the modified ceramsite packing had the advantages of a shorter duration for biomembrane colonization, more bio-loading and the like.

The desulfurization rate was measured at 75.2%, using the unmodified ceramsite as the packing in the biomembrane trickling filter.

Example 4-1

A conventional ceramsite was chemically modified to have performance parameters of: a density of 2.238 g/cm$^3$, a specific surface area of 0.72 m$^2$/g, a porosity of 0.60, a pH value at isoelectric point of 8.50, and a surface pH value of 5.63.

The modified ceramsite was used as the packing to prepare a biomembrane with membrane-forming process in the column. The biomembrane colonization of the modified ceramsite was carried out for 10 days, resulting in a maximal biomass of 1.543 mg/g.

The desulfurization rate was measured at 82.6%, using the modified ceramsite as the packing, having a temperature of 20 degrees C., a gas flow of 180 L/h, a SO$_2$ concentration of 2000 mg/m$^3$, a packing height of 900 mm, a Fe$^{3+}$ concentration of 0.8 g/L, an initial pH value of 1.8 and a liquid spraying rate of 6 L/h in the biomembrane trickling filtration column.

Example 4-2

The process according to example 4-1 was repeated to carry out a desulfurization test with the biomembrane trickling filter under same operation conditions except for a temperature of 25 degrees C. The desulfurization rate measured was 97.3%.

Example 4-3

The process according to example 4-1 was repeated to carry out a desulfurization test with the biomembrane trickling filter under same operation conditions except for a temperature of 35 degrees C. The desulfurization rate measured was 94.4%.

Example 4-4

The process according to example 4-1 was repeated to carry out a desulfurization test with the biomembrane trickling filter under same operation conditions except for a temperature of 40 degrees C. The desulfurization rate measured was 81.9%.

TABLE 1 the relationship between temperature and the desulfurization rate

| Example | Temperature/degrees C. | Desulfurization rate/% |
|---|---|---|
| 4-1 | 20 | 82.6 |
| 4-2 | 25 | 97.3 |
| 4-3 | 35 | 94.4 |
| 4-4 | 40 | 81.9 |

Example 5

The desulfurization rates resulted from various packing heights were measured by varying the packing heights, using the modified ceramsite as the packing, with a temperature of 28 degrees C., a gas flow of 180 L/h, a feeding concentration of SO$_2$ ranging from 500 to 3000 mg/m$^3$, a Fe$^{3+}$ concentration of 0.8 g/L, an initial pH value of 1.8 and a liquid spraying rate of 6 L/h in the biomembrane trickling filter, and the results were showed in FIG. 2.

The testing results from FIG. 2 showed: the source of the flue gas and the desulfurization rate affected the selection on the packing height. The packing height affected directly the energy consumption. When the concentration of the feeding gas was 500 mg/m$^3$, one stage of packing (with a packing height of 300 mm) resulted in a satisfactory desulfurization effect, such that the nutrient fluid was fed at the liquid inlet 3-1; when the concentration of the feeding gas was 1000 mg/m$^3$, two stages of packing (with a packing height of 600 mm) resulted in a satisfactory desulfurization effect, such that the nutrient fluid was fed at the liquid inlet 3-2; and when the concentration of the feeding gas was 2000 mg/m$^3$, three stages of packing (with a packing height of 900 mm) resulted in a satisfactory desulfurization effect, such that the nutrient fluid was fed at the liquid inlet 3-3.

It could be seen by comparing the results from the examples and the comparative examples that, the modified ceramsite as packing increased the specific surface area and hydrophility thereof, so as to enhance the bio-capacity per unit volume of packing; and increased the porosity thereof, so as to enlarge the interface between the gas and the organism, to improve the mass transfer rate of contaminants in the biomembrane trickling filter, and to enhance the desulfurization efficiency. The present invention had the advantages including green environmental protection, high purification performance, low investment cost, low operation cost, high operability, and the like. Therefore, the present invention can be used to remove sulfur dioxide from coal-fired flue gas with high efficiency and low consumption, and thus has favorable economic benefit and social efficiency.

The invention claimed is:

1. A process of removing SO$_2$ from flue gas comprising utilizing a biomembrane trickling filter comprising a packing, in which the biomembrane trickling filter has a principle section of a packed column and further comprises a liquid circulation system and a gas circulation system, wherein the packing is a modified ceramsite obtained from chemically modifying a ceramsite, wherein the modified ceramsite has performance parameters of: a density of about 2.1-about 2.5 g/cm$^3$, a specific surface area of about 0.4-about 0.8 m$^2$/g, a porosity of about 0.5-about 0.7, a pH at isoelectric point of about 7.5-about 9.0, and a surface pH of about 5.0-about 6.0.

2. The process according to claim 1, wherein a desulfurization strain is introduced into a nutrient fluid after the chemical modification of the packing, so as to carry out a biomembrane colonization for the packing in the column, and to form a biomembrane of the desulfurization strain on a packing surface.

3. The process according to claim 2, comprising a counter-current operation manner in the column, wherein the flue gas containing $SO_2$ is fed through the column bottom into the biomembrane trickling filter, contacted with the modified ceramsite biomembrane packing and purified, which purified flue gas is discharged via the column top; and the nutrient fluid rich of the desulfurization strain is sprayed through the column top to the modified ceramsite biomembrane packing, passed through the packing layer and discharged via the column bottom, wherein a ratio of nutrient fluid:bacteria-containing fluid is 50-100:1.

4. The process according to claim 1, wherein the process for chemically modifying the ceramsite packing comprises: drying a cleaned ceramsite; impregnating with a solution of an acid, and washing with water to be neutral; ultrasonic impregnating the neutral ceramsite obtained into an aqueous solution of modifier and baking; calcinating at a temperature of 300 degrees C. to 700 degrees C., cooling to room temperature, washing with water, and baking, so as to obtain the modified ceramsite packing.

5. The process according to claim 1, comprising a membrane-forming step, wherein the membrane-forming step in the column comprises: introducing the desulfurization strain into the nutrient fluid, and spraying the nutrient fluid containing the desulfurization strain in the biomembrane trickling filter downward to the packing, so as to immobilize the desulfurization strain to the packing, and adding dominant bacteria periodically, wherein a ratio of nutrient fluid:bacteria-containing fluid is 50-100:1.

6. The process according to claim 1, wherein the nutrient fluid consists of an aqueous mixture of two or more of ammonium sulfate, potassium chloride, potassium hydrogen phosphate, magnesium sulfate heptahydrate, calcium nitrate, ammonium chloride, ammonium dihydrogen phosphate, calcium chloride and iron(II) sulfate heptahydrate.

7. The process according to claim 2, wherein the desulfurization strain is one or more selected from the group consisting of *Thiobacillus ferroxidans*, *Thiobacillus thioparus*, *thiobacillus denitrificans*, *desulfovibrio*, *Leptospirillums ferrooxidans*, *thiobacillus thiooxidans* and *Thiothrix*.

8. The process according to claim 1, wherein the biomembrane trickling filter is constructed as a multi-stage packing column.

9. The process according to claim 1, wherein the temperature during the desulfurization in the biomembrane trickling filter is controlled to be 20-40 degrees C.

10. The process according to claim 4, wherein the modifier is an aqueous solution of iron chloride, ferric nitrate, aluminum sulfate or aluminum chloride.

11. The process according to claim 9, wherein the temperature during the desulfurization in the biomembrane trickling filter is controlled to be 25-35 degrees C.

* * * * *